United States Patent [19]

Brill et al.

[11] Patent Number: 4,532,181

[45] Date of Patent: * Jul. 30, 1985

[54] MULTILAYER WEB FOR REDUCING LOSS OF RADIANT HEAT

[75] Inventors: Klaus Brill, Korntal; Wolfgang Grothe, Tiefenbronn, both of Fed. Rep. of Germany

[73] Assignee: Robert Bosch GmbH, Stuttgart, Fed. Rep. of Germany

[*] Notice: The portion of the term of this patent subsequent to May 22, 2001 has been disclaimed.

[21] Appl. No.: 481,864

[22] Filed: Apr. 4, 1983

Related U.S. Application Data

[63] Continuation-in-part of Ser. No. 420,813, Sep. 21, 1982, abandoned.

[30] Foreign Application Priority Data

Oct. 9, 1981 [DE] Fed. Rep. of Germany ....... 3140100
Sep. 30, 1982 [EP] European Pat. Off. ....... 82 109 036.2

[51] Int. Cl.³ ............................................. B32B 15/08
[52] U.S. Cl. .................................... 428/336; 428/458; 428/469; 428/472; 428/480; 428/698; 428/702
[58] Field of Search ............... 428/472, 458, 469, 480, 428/701, 698, 336, 702; 303/119

[56] References Cited

U.S. PATENT DOCUMENTS

| 4,017,661 | 4/1977 | Gillery | 428/472 X |
| 4,022,947 | 5/1977 | Grubb et al. | 428/472 X |
| 4,166,876 | 9/1979 | Chiba et al. | 428/472 X |
| 4,234,654 | 11/1980 | Yatabe et al. | 428/472 X |
| 4,284,687 | 8/1981 | Dreyer et al. | 428/472 X |
| 4,367,265 | 1/1983 | Yu et al. | 428/701 X |
| 4,450,201 | 5/1984 | Brill et al. | 428/336 |
| 4,462,642 | 7/1984 | Leiber | 303/119 |

*Primary Examiner*—Thomas J. Herbert
*Attorney, Agent, or Firm*—Frishauf, Holtz, Goodman & Woodward

[57] ABSTRACT

A substantially transparent multilayer web with high reflectivity in the far infra-red spectral range based on a polyester foil carrier and utilizing a metal layer, preferably of silver, has dielectric protective layers on both sides of the silver layer containing bismuth oxide, which has a desired corrosion-protection effect, as well as desirable optical properties. The bismuth content is between 10 and 85% by weight of the total metal content of the dielectric layer. Another oxide is used, either in a separate layer or as an admixture to reduce the effect of ultraviolet light.

10 Claims, 2 Drawing Figures

MULTILAYER WEB FOR REDUCING LOSS OF RADIANT HEAT

This application is a continuation-in-part of our application Ser. No. 420,813, filed Sept. 21, 1982, and now abandoned.

This invention concerns a multilayer web, including a transparent carrier foil, a metal film or layer and certain other layers, the composite web having high reflectivity in the far infrared spectral region and high transmissivity in the visible light and near infrared spectral regions. Known multilayer webs of this sort for reducing loss of radiant heat are disclosed in our copending patent application owned by the Assignee of this application, Ser. No. 311,065, filed Oct. 31, 1981, issued as U.S. Pat. No. 4,450,201 on May 22, 1984. The web there disclosed, however, has been found still to be subject to attack by environmental influences, such as damaging gases and ultraviolet light.

SUMMARY OF THE INVENTION

It is an object of the present invention to provide an improved multilayer web for reducing loss of radiant heat having a long service life by virtue of possessing better protection against corrosion by dielectric covering layers on both sides of the metal layer of a particularly effective character.

Briefly, at least one of the two dielectric layers contains bismuth oxide and the bismuth content lies between 10% and 85% by weight of the aggregate metal content of the dielectric layer in question. These layers are from 15 to 40 nm in thickness and the remainder of their dielectric material is made up of oxide and/or nitride of titanium, tin, lead, indium, zinc tantalum, cerium and/or antimony. The metal film is of silver, gold, aluminum or copper. A particularly effective multilayer web is provided when each of the dielectric layers is composed of a corrosion protection layer of bismuth oxide and a layer for protection against ultraviolet light consisting of titanium oxide or titanium oxide-nitride, and in such case it is particularly effective when the ultraviolet light protection portion of the dielectric layer is adjacent to the metal layer on both sides. The metal layer is preferably of silver.

The total thickness of each protective covering layer is preferably between 15 and 40 nm and from 20 to 60% of this thickness is taken up by the corrosion protection portion consisting of bismuth oxide, while 40 to 80% of it is taken up by the portion for protection against ultraviolet light consisting for example of titanium oxide and/or titanium nitride. It is further preferable for the outer covering layer to be thinner than the covering layer provided between the metal layer and the carrier foil. In another embodiment of the invention, at least one of the two covering layers that are located respectively on opposite sides of the metal layer consists of a mixed oxide material of bismuth oxide and at least one other oxide selected from oxides of the metals tin, lead, indium, zinc, titanium, tantalum, cerium and antimony, in which embodiment the covering layers are not subdivided into sublayers.

The carrier is preferably a polyester foil.

Further details concerning the preferred constitution of the protective covering layers on each side of the metal layer are given in the description that follows.

The advantage of the invention is a prolonged useful life of the layered web, as has been found by corrosion tests and irradiation with ultraviolet light. The materials and the combination thereof are so chosen that the required optical characteristics are obtained, i.e., a high reflection capability in the far infrared spectral region and a high transmissivity in the visible spectrum region and in the near infrared spectral region. The total thickness of the protective covering layer, especially the outer layer, is in accord with the phase requirements, so that the path length difference for rays reflected at the respective layer boundaries should amount to substantially half the wavelength of light in the layer material.

DESCRIPTION OF THE ILLUSTRATED EMBODIMENTS

Figure 1:
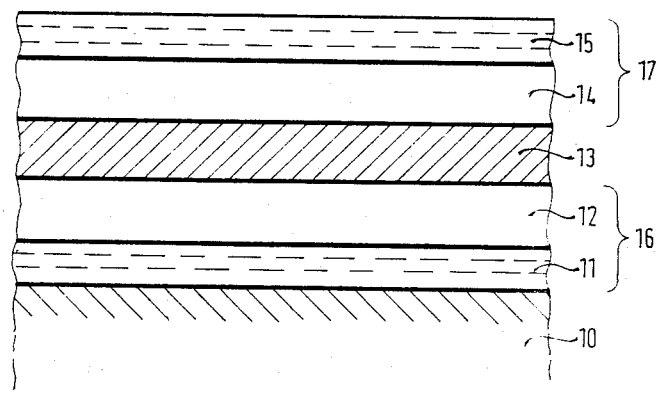
FIG. 1 is a diagrammatic cross-section of a first embodiment of a multilayer web according to the invention, in which each of the covering layers on both sides of the metal layer is constituted of two layer portions.

The multilayer web shown in cross-section in FIG. 1 has a carrier 10 which is preferably a polyester foil, on which there are provided, in succession, a corrosion protection layer 11, a layer 12 for protection against ultraviolet light, a metal layer 13, then again a layer 14 for protection against ultraviolet light and a corrosion protection layer 15. The layers 11 and 12 together constitute a dielectric covering layer adjacent to the carrier foil 10 and to the metal layer 13, while the layers 14 and 15 together constitute a dielectric outer covering layer 17. The constitution of these dielectric covering layers is now to be constituted. The layer system of FIG. 1 is constituted to prevent damaging environmental effects, in that at least one of the two dielectric covering layers, especially the outer covering layer 17, contains bismuth oxide. For this purpose in the layer system shown in FIG. 1, the covering layer 17 is subdivided into a layer 14 for protection against ultraviolet light and a corrosion-preventing layer 15 consisting of bismuth oxide. The layer 14 for protection against ultraviolet light preferably consists of titanium oxide. It may consist of titanium oxide entirely, but usually there is also a content of titanium nitride or titanium oxynitride, in either of which cases the layer may be described as composed of titanium oxidenitride. The oxide is usually predominant, and the nitrogen content may be in the range between 2 and 20% by weight. Nitride may improve the index of refraction.

The covering layer 16, likewise subdivided into a corrosion protection layer 11 and a layer 12 for protection against ultraviolet light, is constituted in the structure of FIG. 1 in the same way as the outer layer, but in mirror image thereto, so that the corrosion protection layer 11 lies against the carrier 10 and prevents damaging effects from the carrier 10 that may arise during lengthy storage, for example. The bismuth component in the layer 17 and preferably also in the layer 16 constitutes between 10 and 85% by weight of the total metal content of the dielectric layer, i.e., between 10 and 85% by weight of the aggregate content of bismuth and titanium in the case just described.

The metal layer is preferably of silver, but gold, aluminum and copper are also usable for the metal layer in the multilayer web of the invention.

The total thickness of each composite covering layer 16 and 17 is in the range from 15 to 40 nm, with 20 to 60% of this thickness being taken up by the corrosion protection layer 11 or 15 of bismuth oxide and 40 to 80% of the thickness being taken up by the layer 12 or 14 for protection against ultraviolet light of titanium oxide and titanium-oxide-nitride. It should be noted that the bismuth oxide layer in this illustrated structure has only about one-third of the thickness which would be necessary without the supplemental layer for protection against ultraviolet light. Changes in the bismuth oxide produced by ultraviolet irradiation, which cannot be completely prevented and lead to a higher absorption in the visible range of the spectrum, are hardly noticeable optically because of the small thickness of the bismuth oxide layer.

The maximum bismuth content prescribed for the dielectric layers is in accord with the above-given maximum thickness of the bismuth portion of the layer in the structure of FIG. 1. Thus, when 60% of the thickness of the dielectric layers is occupied by bismuth oxide, it follows by calculation in the case of the combination with titanium dioxide that a bismuth content of 85% by weight is present.

Figure 2:
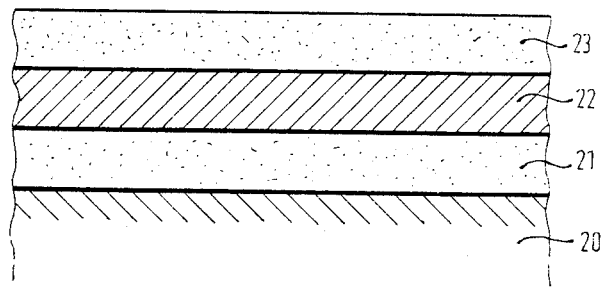
FIG. 2 is a diagrammatic cross-section of a second embodiment of multilayer web according to the invention in which a dielectric mixture layer is provided on each side of the metal layer.

FIG. 2 shows another illustrative embodiment of the invention, again with a carrier 20. Directly on the carrier is a covering layer 21, on top of which a metal layer 22 is provided, and finally there above a covering layer 23. The carrier 20 is conveniently and preferably, as in the case of FIG. 1, a polyester foil. The metal layer 22 again is preferably a silver layer. In this case, the covering layers 21 and 23 consist of mixed oxides constituted by bismuth oxide and at least one additional oxide selected from the oxides of the metals tin, lead, indium, zinc, titanium, tantalum, cerium and antimony. A mixed oxide material consisting of bismuth oxide and oxide of the metals indium, tin and lead has been found particularly useful. The metallic components in the layer in this case preferably are 15% by weight bismuth, 25% by weight indium, 25% by weight tin and 35% by weight lead, but the percentage content of these metals can of course vary about the preferred values above given over a certain range. Experiments have shown that with these types of layers, the bismuth content must not be less than 10% by weight.

For optimizing the optical properties of the web structure of FIG. 1 or that of FIG. 2, it can be advantageous to provide some asymmetry of the oxide layer thicknesses on the two sides of the silver layer. In general, it is more favorable from the optical standpoint for the exposed outer cover layer 17,23 to be thinner than the covering layer 16,21 facing the carrier 10,20.

Investigation has shown that the reaction of the multilayer systems of the invention to various stresses resulting from damaging gas and/or ultraviolet light effects are different. Thus, a silver layer in the system bismuth oxide/silver/bismuth oxide has relatively good resistance against $SO_2$ effects, but is not very resistant to ultraviolet irradiation. With stronger ultraviolet effects, a clouding is produced that on the one hand, as already mentioned, is caused by changes in the bismuth oxide and, on the other hand, is also caused by a diffusion and coagulation of the silver. This process is connected with a rise of the electrical resistivity of the silver/layer. In a titanium oxide/silver titanium oxide system, where the titanium oxide can contain a titanium nitride content, the titanium oxide layer offers a slight protection against $SO_2$ effects, but it has a substantially higher protective effect for silver against ultraviolet radiation. The layer system according to the invention utilizes the different effects of the various metal oxides in such a way that in each case the advantageous properites of the bismuth oxide layer and of, for example, a titanium oxide layer, are utilized. For this purpose, in the arrangement of FIG. 1, on both sides of the silver layer 13 there should first be a layer 12,14 for protection against ultraviolet light, and only on that layer a covering of bismuth oxide serving as a corrosion protection layer 11,15. The titanium oxide layer prevents the observed diffusion and coagulation of the silver which would otherwise result from ultraviolet light effect. The bismuth oxide coating prevents corrosion effects which would occur much earlier when titanium oxide alone is used and often make themselves noticeable locally for formation of holes. The bismuth oxide layer can be thinner than when bismuth oxide is used alone, which is advantageous with regard to the clouding that is not completely preventable.

An improvement in service life, such as is obtained with the system of FIG. 1, can also be obtained in an embodiment according to FIG. 2, where the diffusion of the metal, particularly the diffusion and coagulation of silver between bismuth oxide layers, is mitigated by the admixture of other oxides having a higher refraction coefficient. The bismuth content in the covering layers 21 and 23 should preferably not exceed 50% by weight of the total metal content of the covering layer, because otherwise impairment produced by ultraviolet light would have too strong an effect. For admixture to bismuth oxide, it is particularly suitable to utilize the oxides of tin, lead, indium, zinc, antimony, tantalum, cerium and titanium. A mixture can consist of an admixture of a single different oxide to bismuth oxide. Particularly good results are obtained, however, with the admixture of several oxides of the above-named group. The improvements by the above-mentioned admixtures to bismuth oxide concern the optical properties, as well as the corrosion resistance and the sensitivity to ultraviolet light.

The preferred method of making the multilayer web for reduction of radiant heat losses with improved protection against corrosion in accordance with the present invention is the method described in our abovementioned copending patent application, Ser. No. 311,065, filed Oct. 31, 1981, merely changing the particular materials applied to form the layers in accordance with the present invention so far as may be necessary.

The method in question uses reactive atomization, sometimes referred to as sputtering, performed in a noble gas at low pressure, which may be ordinarily reactive cathodic atomization or reactive magnetron atomization (see e.g., John S. Chapin, "The Planar Magnetron", Research/Development January 1974, pp. 37–40), in which the combination of electrostatic and magnetic fields, characteristic of magnetron operation, controls the path of the electrons within the plasma greatly increasing the ionization of the noble gas and hence also the atomization rate of the target materials. The combination of magnetron atomization and vapor deposition on a movable web provides high atomization rates. The atomization is "reactive" in the sense that residual oxygen and/or nitrogen in the low-pressure vessel reacts with the metal being atomized to provide a deposit of an oxide, nitride or oxy-nitride, either of stoichiometric composition or of substoichiometric composition, according to the concentration of oxygen and/or nitrogen in the residual atmosphere.

In our aforesaid copending patent application, the deposition of material, on a polyester foil of 0.05 mm thickness, is disclosed as being done in a pass through the atomization apparatus with a tape or web speed of 0.5 meters per minute. For non-reactive atomization, as in the case of a silver layer, the residual atmosphere is argon at a partial pressure of $1 \cdot 10^{-3}$ mbar for application of silver at a rate of 100 nm/min. For reactive atomization the partial pressures of the gases are $P_{Ar}=5\cdot 10^{-4}$ mbar, $P_{O2} 3\cdot 10^{-4}$ mbar and $P_{N2}=3\cdot 10^{-4}$ mbar, and the deposition rate is 140 nm/min.

In the present invention, the corrosion inhibiting material is provided in at least one of the dielectric covering layers provided below and above the thin metal layer of silver, gold, aluminum, or copper, by providing a bismuth oxide content such that bismuth constituted between 10% and 85% by weight of the metal content of the dielectric covering layer. Consequently, in the case of the present invention, the application of the dielectric covering layer is preferably performed by reactive atomization at partial pressures of the gases of the order of those given above with bismuth being atomized along with the titanium (or the other metal or metals of the dielectric layer).

Alternately, in accordance with Example 2 of said copending application, in which the dielectric layer is made by passing the web or tape along the cathode in different atmospheres, for example an argon-oxygen mixture in which the oxygen partial pressure is $5\cdot 10^{-4}$ mbar, and an argon-nitrogen mixture in which the nitrogen partial pressure atmosphere is $5\cdot 10^{-4}$ mbar, the bismuth may be incorporated into the layer only during the pass in the oxygen-containing atmosphere. On the other hand, in the procedure of Example 3 of our copending application, in which the nitrogen-containing atmosphere also contains oxygen, the bismuth may be atomized along with the titanium in all passes.

Although these examples refer to the use of titanium for the component other than bismuth of the dielectric layer, the method is essentially the same. For example, deposition of the above-described mixed oxide material consisting of bismuth oxide and oxides of the metals indium, tin and lead, can be performed by reactive atomization in basically the same way as described for titanium oxide in our aforesaid copending application, with the substituion of the appropriate metal cathodes for the titanium cathode in the atomization apparatus.

Likewise, the multilayer structure described further above with a titanium oxide next to a silver layer for protection against ultraviolet radiation and a bismuth oxide coating outside each titanium oxide layer for preventing corrosion effects, the apparatus and residual atmosphere may be the same, but separate passes, first along a titanium cathode and then along a bismuth cathode, are performed.

Although the preferred process for making the multi-layered transparent heat-containing web of the present invention is, as above described, a cathodic sputtering process, in a more general sense, the process of making the web is the deposition in a low-pressure atmosphere of the appropriate metals under conditions in which the oxide will be formed in the case of the dielectric and corrosion-inhibiting layers. Vapor deposition at low pressure is also suitable for providing not only the film of silver, gold, aluminum or copper, but also for the provision of the oxide films, if necessary with the inclusion of moisture in the residual atmosphere to promote oxidation of the bismuth and titanium during and/or after deposition.

Thus, although the invention has been described with reference to particular illustrative examples, it will be understood that variations and modifications are possible within the inventive concept. For example, an anti-reflecting layer for visible light may be provided on the other side of the polyester foil substrate as shown at 39 in FIG. 3 of our above-mentioned copending application Ser. No. 311,065, filed Oct. 31, 1981, issued as U.S. Pat. 4,450,201.

We claim:

1. Multilayer protective web having high reflectivity for the far infra-red spectral region and good transmissivity for the visible light and near infra-red spectral regions comprising a transparent carrier foil, a thin layer of a metal selected from the group of silver, gold aluminum and copper, and at least one dielectric covering layer of a thickness in the range from 15 to 40 nm, on each side of said metal layer all on the same side of said carrier foil, wherein, at least one of said dielectric covering layers has a bismuth oxide content such that bismuth constitutes between 10% and 85% by weight of the metal content of said covering layer, the remainder of the metal compound content of said dielectric layers being at least one compound, selected from the group consisting of oxides, nitrides and oxide nitrides of at least one metal selected from the group consisting of titanium, tin, lead, indium, zinc, tantalum, cerium and antimony.

2. Multilayer web according to claim 1, in which said carrier foil is a polyester foil.

3. Multilayer web according to claim 1, in which said at least one dielectric covering layer is composed of a corrosion-protection layer of bismuth oxide and a layer for protection against ultraviolet light of a substance selected from the group consisting of titanium oxide and titanium oxide nitride.

4. Multilayer web according to claim 3, in which said metal layer is of silver, adjacent to which there is on both sides thereof a layer protective against ultraviolet light of a substance selected from the group consisting of titanium oxide and titanium oxide-nitride and, on the side of each of the latter layers away from the silver layer there is a corrosion-protection layer of bismuth oxide.

5. Multilayer web according to claim 2 or claim 4 in which 20% to 60% of said overall thickness of said at least one covering layer (16,17) is provided by said corrosion-protection layer of bismuth oxide and 40% to 80% of said thickness is provided by said layer for protection against ultraviolet light.

6. Multilayer web according to claim 3 or claim 4, in which there are two dielectric covering layers each composed of a corrosion-protection layer of bismuth oxide and a layer for protection against ultraviolet light, said two layers being of different thickness, with that one of said layers that lies between said carrier (10,20) and said metal layer being thicker than the one of said covering layers on the other side of said metal layer.

7. Multilayer web as defined in claim 1, in which at least one of said two covering layers (21,23) is a mixed oxide layer consisting of bismuth oxide and at least one oxide selected from the group consisting of oxides of the metals tin, lead, indium, zinc, titanium, tantalum, cerium and antimony.

8. Multilayer web as defined in claim 7, in which at least one said covering layer (21,23) has a bismuth oxide content in which the bismuth content chemically bound in bismuth oxide constitutes between 10% and 50% of the total content of metal combined in oxide form.

9. Multilayer web as defined in claim 7, in which said at least one covering layer of mixed oxide material is a mixed oxide of the metals bismuth, indium, tin and lead.

10. Multilayer web as defined in claim 9, in which the content of metal combined with oxygen as oxide is approximately 15% by weight bismuth, 25% by weight indium, 25% by weight tin, and 35% by weight lead.

* * * * *